US009065967B2

(12) United States Patent
Hubner et al.

(10) Patent No.: US 9,065,967 B2
(45) Date of Patent: Jun. 23, 2015

(54) METHOD AND APPARATUS FOR PROVIDING DEVICE ANGLE IMAGE CORRECTION

(75) Inventors: Paul Hubner, McKinney, TX (US); Robert A. Clavenna, Lucas, TX (US); Kristopher Pate, Flower Mound, TX (US); Steven T. Archer, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 919 days.

(21) Appl. No.: 13/231,147

(22) Filed: Sep. 13, 2011

(65) Prior Publication Data

US 2013/0063538 A1 Mar. 14, 2013

(51) Int. Cl.
*H04N 7/14* (2006.01)
*G06K 9/00* (2006.01)
*G06K 9/22* (2006.01)
*G06K 9/32* (2006.01)

(52) U.S. Cl.
CPC ............ *H04N 7/142* (2013.01); *G06K 9/00228* (2013.01); *G06K 9/228* (2013.01); *G06K 9/3275* (2013.01)

(58) Field of Classification Search
USPC ....................... 348/14.01, 14.02, 14.12, 14.16
See application file for complete search history.

(56) References Cited

U.S. PATENT DOCUMENTS 8,174,555 B2 * 5/2012 Border et al. .............. 348/14.01
2011/0090303 A1 * 4/2011 Wu et al. .................... 348/14.16

* cited by examiner

*Primary Examiner* — Olisa Anwah

(57) ABSTRACT

An approach for providing device angle image correction. An image (e.g., still or moving) of a subject is captured via a camera of a mobile device. One or more geometrics parameters associated with the subject are determined in relation to the mobile device. One or more camera parameters for the mobile device are also determined. An image correction scheme is applied to the image based on the camera parameters and the geometrics parameters to output a modified image.

18 Claims, 11 Drawing Sheets

METHOD AND APPARATUS FOR PROVIDING DEVICE ANGLE IMAGE CORRECTION

BACKGROUND INFORMATION

User devices, such as mobile phones (e.g., smart phones), laptops, tablets, personal digital assistants (PDAs), etc., provide various forms of image and video capturing capabilities. In addition, mobile video conferencing, which provides for two or more locations to interact via two-way video and audio transmissions simultaneously, has become increasingly popular with consumers. In attempting to provide images of themselves, users often find it difficult to capture and provide quality images (e.g., aesthetically pleasing), in large part, because of the manner in which the image is captured—that is, the position of the camera.

Therefore, there is a need for an approach that can enhance images to correct for improper camera positioning.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A method, apparatus, and system for providing device angle image correction are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
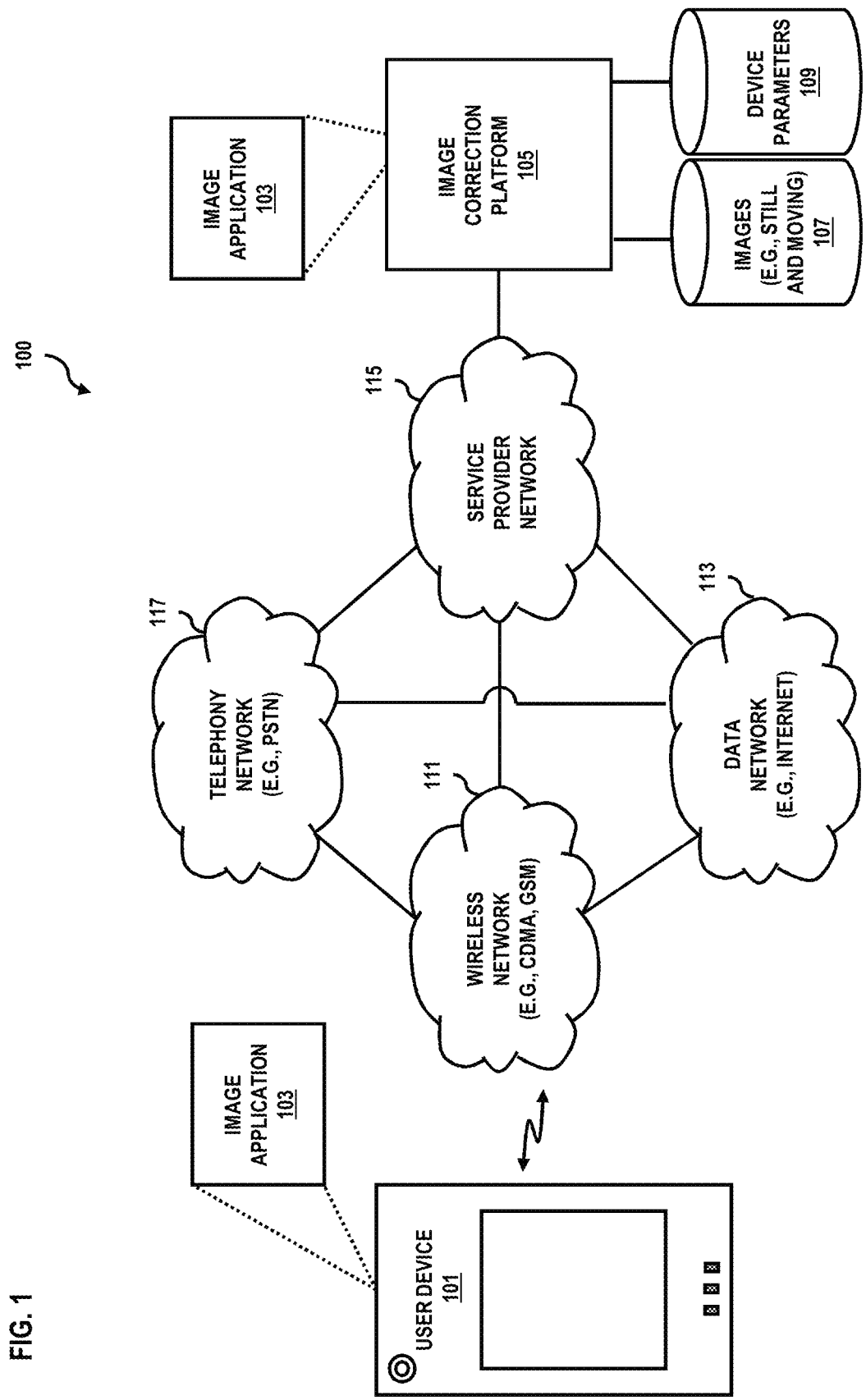
FIG. 1 is a diagram of an image correction platform for providing image modification, according to an exemplary embodiment.

FIG. 1 is a diagram of a system capable of providing image modification, according to an exemplary embodiment. For the purpose of illustration, system 100 includes a user device 101, which can be configured to provide improved or enhanced images that may be distorted because of camera angles, for instance. It is recognized that users may not be aware of the quality of the images they are providing, especially when they themselves are the subject a video communication session or recording. People generally have come to expect images (including moving images (videos) to be captured and presented in a nearly professional manner, particularly in light of the abundance of sophisticated applications and equipment used to capture images and videos for viewing on broadcast television and on the internet. Unfortunately, personal images (e.g., photographs and/or videos), such as those in which the user of the image capturing device is the subject of the images rarely meet the expected level of quality. A low quality image production may result from the user not positioning the user device at a sufficient angle that is appropriate for the ambient lighting, for instance.

As an example, a user of device 101, participating in a mobile videoconferencing session, may unknowingly provide the other participants of the session with poor quality video (e.g., exaggerated facial features, shadows) of the user's face, thereby diminishing the experience for all parties to the conference. However, by shifting the angle and location of the device, the perspective of the shared image could be modified to a more familiar and recognizable image. Appropriate camera angles and lighting conditions may be commonly appreciated by professionals trained in capturing images and videos, but are not known to consumers. Further, because of the design of the user device and the manner in which such user device is customarily used, angle position of the camera may not be optimal for picture quality. That is, users may hold their devices at chest height and with their arms fully extended; such position is typical to ensure comfort—as extending the arms out parallel to the floor can be tiring.

To address this problem, the approach of system 100, according to certain embodiments, enables user device 101 to modify an image to correct for a distortion or warp in the image due, in part, to the angle of the device 101 relative to the subject (e.g., the user). An image application 103, resident on the user device 101, can be configured to modify an incoming image signal based on one or more sensor readings (e.g., camera lens data, lighting, face detection, focal length data, accelerometer angle, etc.) by dynamically de-warping the image to improve the final displayed image, and/or adjusting for lighting conditions due to poor camera placement. For example, a self-captured photo of a user, in which the user holds the user device 101 at an angle lower the than the user's line of sight, may result in the user's chin being exaggerated in the photo and portions of the user's face above the user's line of sight may include various shadows. The image application 103 could thus provide image de-warping techniques and lighting adjustments to improve the captured photo.

In certain embodiments, the user device 101 can be a mobile device, such as cellular phones, BLUETOOTH-enabled devices, WiFi-enable devices, radiophone, satellite phone, smart phone, wireless phone, or any other suitable mobile device, such as a personal digital assistant (PDA), pocket personal computer, tablet, customized hardware, etc., all of which may include a user interface, media application, and image capturing. It is contemplated that the user device 101 may be any number of other processing devices, such as, a laptop, netbook, and/or desktop computer.

The user device 101 may be configured to capture images by utilizing an image capture device (e.g., camera, camcorder, etc.) and to store images locally at the device and/or at an external repository (e.g., removable storage device, such as a flash memory, etc.) associated with the device 101. For example, the user device 101 may execute a camera or image application 103 that renders images; thus, the image application 103 can benefit from the rendering capability described herein. In addition, the user device 101 may provide the user with the ability to interact with an image correction platform 105. In addition, the user device 101 may be configured to display images that are captured. In certain embodiments, the term "image" can refer to still images (e.g., photos) and/or moving images (e.g., video).

In certain embodiments, the image correction platform 105 system is configured to provide execution of the image application 103 for enabling improvement of visual presentation of images. In addition, the image application 103 can be executed solely by user device 101 (as illustrated). Under the scenario of FIG. 1, platform 105 can provide a managed service for a service provider—i.e., the offered service of "image correction." Alternatively, the functions of the image application 103 can be shared between user device 101 and platform 105 depending on, e.g., processing and networking resource allocation factors. The user device 101 can interact with the image correction platform 105 to activate the capabilities of the image application 103. In certain embodiments, images are transmitted by a requesting user device (e.g., device 101) to image correction platform 105 for correcting the image in real-time for ultimate delivery to another user device (not shown).

Hence, the image correction platform 105 may operate in connection with image application 103 of the user device 101 by way of a communication network. The image correction platform 105, among other capabilities, can retrieve and store captured image and video data, as well as user device parameter information. In embodiments, images database 107 may be configured to store captured image data, and user device parameters database 109 may be configured to user device information (e.g., device type, camera resolution, lens data, angle most often used, etc.).

In some embodiments, the image correction function of platform 105 may obtain the device orientation, lens lighting values and other camera details to determine camera and geometrics parameters associated with the user device 101. These parameters are then utilized to enhance the image. As noted, the functions of platform 105 for the enhancement of the images can be performed by image application 103 within user device 101.

In system 100, according to certain embodiments, one or more networks, such as wireless network 111, data network 113, service provider network 115, and/or telephony network 117, are provided to handle various communication sessions, voice communications, as well as non-voice communications. Networks 111-117 may be any suitable wireline and/or wireless network. For example, telephony network 117 may include a circuit-switched network, such as the public switched telephone network (PSTN), an integrated services digital network (ISDN), a private branch exchange (PBX), or other like network.

Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Figure 2:
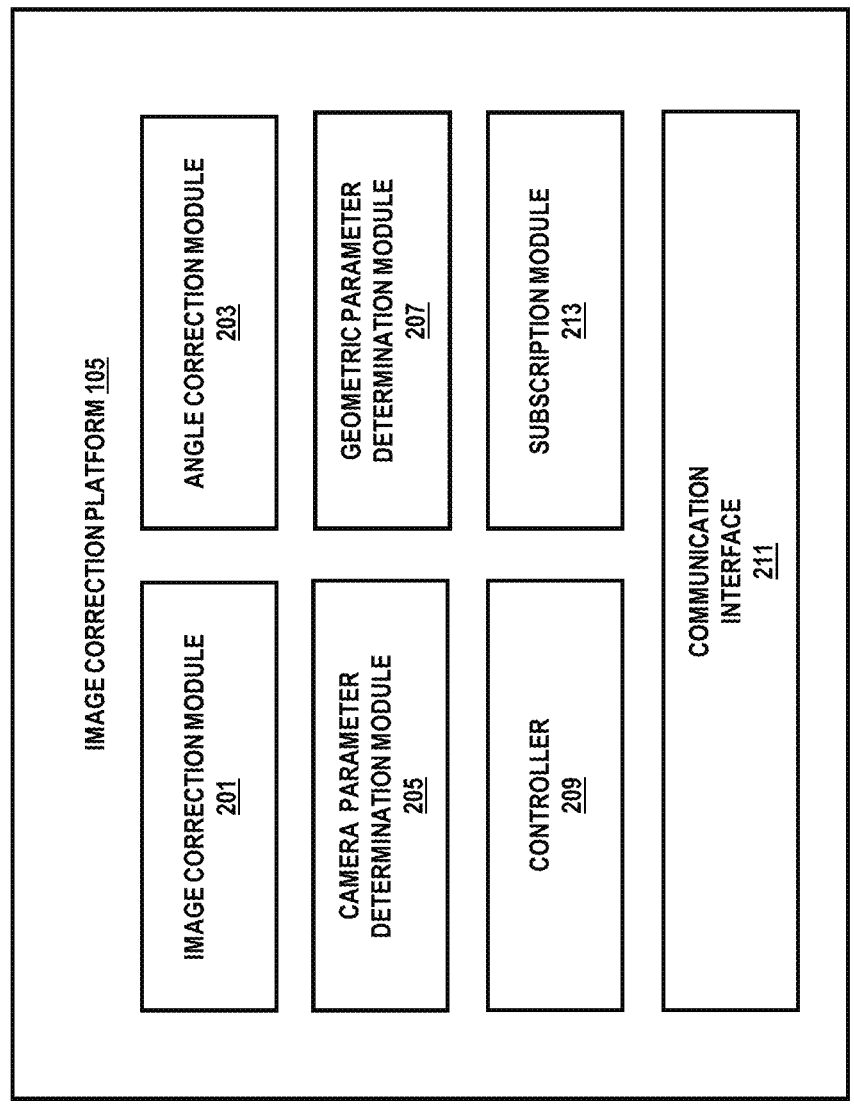
FIG. 2 is a diagram of an image correction platform, according to an exemplary embodiment.

FIG. 2 is a diagram of an image correction platform, according to an exemplary embodiment. Under this example, the image correction platform 105 includes various executable modules for performing one or more computing, data processing and network based instructions that in combination enable a user device 101 to provide enhanced, modified images (which may include still or moving images (e.g., videos)). Also, it is noted that the modules encompassing the image correction platform 105 can be implemented in hardware, firmware, software, or a combination thereof.

By way of example, the image correction platform 105 can include an image correction module 201 that is configured to provide image modification, and an angle correction module 203 configured to correct the image based on the angle of the device that is capturing the image. The image correction platform 105 may also include a camera parameter determination module 205, a geometrics parameter determination module 207, a controller 209, and a communication interface 211. The camera parameter determination module 205 can determine various stored parameters associated with the camera or image capturing functions and capabilities of user device 101; such data can be stored in device parameters database 109. For example, the camera determination module 205 may be configured to determine user device type, camera resolution, lens data, angle most often used with the user device, etc., either from a repository or receive directly from the corresponding user device 101. Similarly, the geometrics parameter determination module 207 can be configured to determine various other parameters pertaining to the image (e.g., screen angle, location of the face of the subject, etc.). Accordingly, the geometrics parameter determination module 209 may acquire measurements relating to the angle of the image capturing with respect to the subject of the image, the current location of the user device, and the current position of the user device.

The controller (or processor) 209, may include one or more processors for effectuating the aforementioned features and functionality of the image correction platform 105, as well as one or more memories (not shown) for permanent and/or temporary storage of one or more of the aforementioned variables, parameters, information, signals, etc. In this manner, the features and functionalities for modifying an image may be executed by controller 209 and/or memories, such as in conjunction with one or more of the various components of image correction platform 105.

In one embodiment, a subscription module 213 is included in the platform 105 to validate users and/or mobile devices to enable processing of the images. For example, the module 213 can perform a subscription procedure to register users for the image correction service. The module 213 can also perform authentication, authorization, and accounting functions with respect to the service. In this manner, the module 213 can be configured to determine whether the mobile device 101 (or user) is associated with a predetermined user account to permit acceptance of the image for enhancement.

It is noted that communication sessions can be established over a circuit-switched network, a packet-switch network, or a combination thereof. Thus, the communication interface 211 can be appropriately configured depending on the transport systems and networks. Furthermore, the communication interface 211 may provide a means of collaborative data exchange and communication between the user device 101 and the image correction platform 105.

FIGS. 3A-3D are flowcharts of processes for providing image modification, according to various embodiments. For the purpose of illustration, the processes are described with respect to FIG. 1, and can be performed by image correction platform 105. It is noted that the steps of the process may be performed in any suitable order, as well as combined or separated in any suitable manner. Process 300 includes the capture of image information user device 101 (e.g., smart phone), per step 301. Such capture can be part of a video communication session or a voice-based session, whereby a current static image of the user is employed. In step 303, process 300 determines one or more geometrics parameters (e.g., angle, distance, etc.) of the image from the user device 101 using one or more embedded sensors. In one embodiment, step 303 can involve the detection of the face or facial structure of the user; thereafter, processing can be performed to calculate distances and dimensions to specific facial features (e.g., chin, nose, eyes, mouth, etc.). In this manner, geometrics parameters, such as screen angle and face location, can be computed, for example. In step 305, parameters associated with the camera are alternatively or additionally obtained. Per step 307, a modified image is generated by applying a correction scheme according to determined camera parameters and geometrics parameters. This scheme, in one embodiment, can be applied dynamically such that only certain frames of the image are altered and/or in real-time (e.g., concurrent with the transmission of the image in a communication session). The modified image results in a more direct perspective of the subject relative to the camera, and thus, more attractive in general. The correction scheme, according to one embodiment, is more fully detailed with respect to FIG. 3C.

Figure 3A:
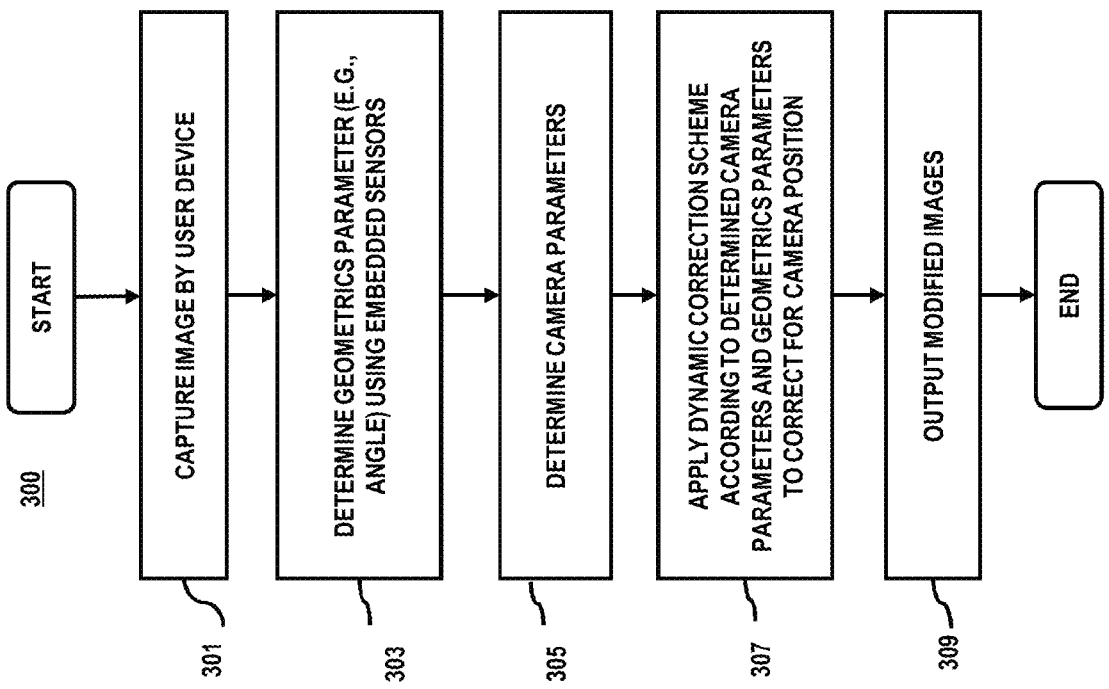
FIGS. 3A-3D are flowcharts of processes for providing image modification, according to various embodiments.
Figure 3B:
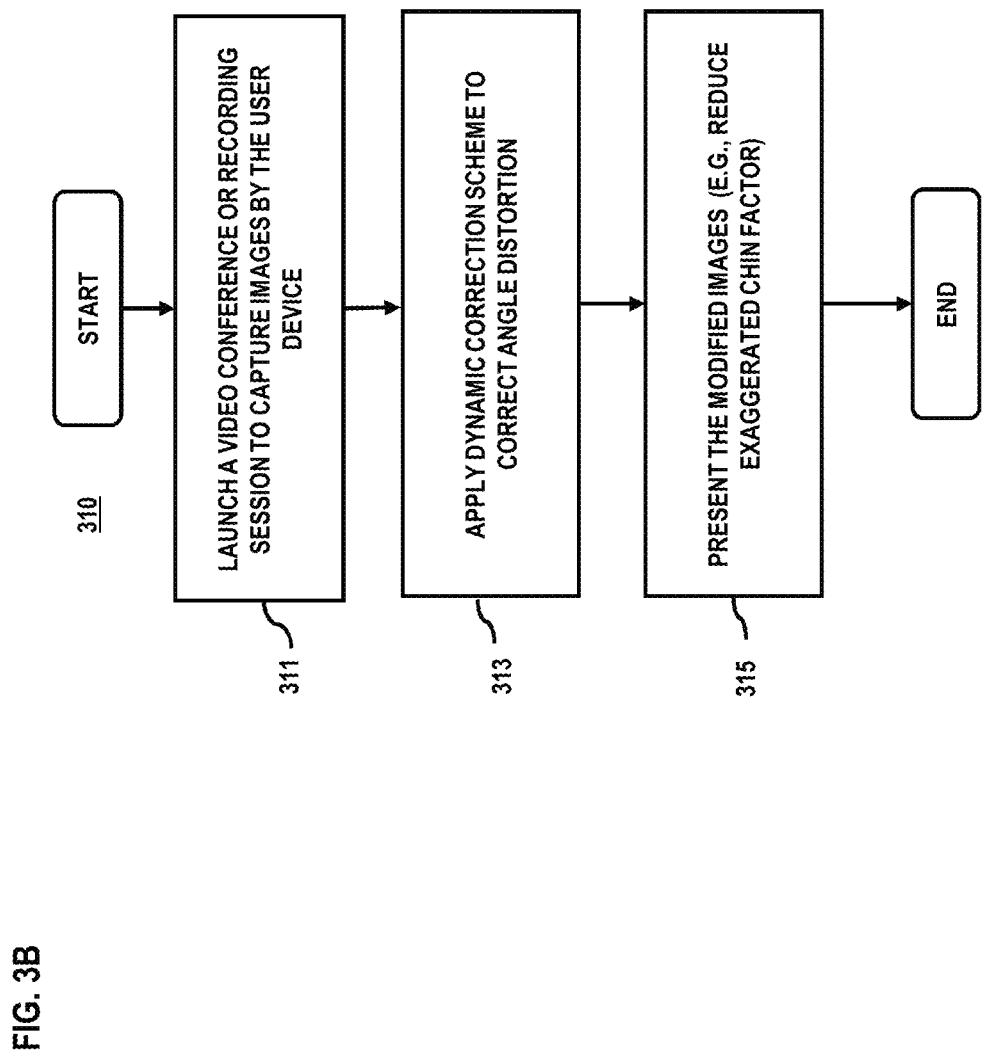

A use case is described, whereby the image correction process 300 is integrated with a communication session (shown in FIG. 3B). Process 310 involves user device 101 launching, per step 311, a video conference or recording session to capture images by the user device 101 by invoking an associated application (e.g., video chat session, etc.). The application, in turn, triggers the application of the correction scheme in real-time to correct the angle distortion (stemming from the position of the user device 101 relative to the subject user). That is, the correction scheme can be made a part of the application. As with process 300, the camera and geometrics parameters, such as the angle of the image with respect to the image capture device (e.g., camera) of the user device 101, can be determined and utilized in the correction of the angle distortion. In step 313, process 310, as executed by the application, applies the image correction scheme to the image, according to determined camera and geometrics parameters, to enhance the images. In step 315, the modified images are transmitted and presented to a recipient user (via a destination or recipient user device) who is the other participant of the video session. Using this approach, the user, whose image is corrected, has an image that is improved in terms of presentation—e.g., reduced exaggerated chin factor resulting from the lighting adjustment of the camera device's angle.

Figure 3C:
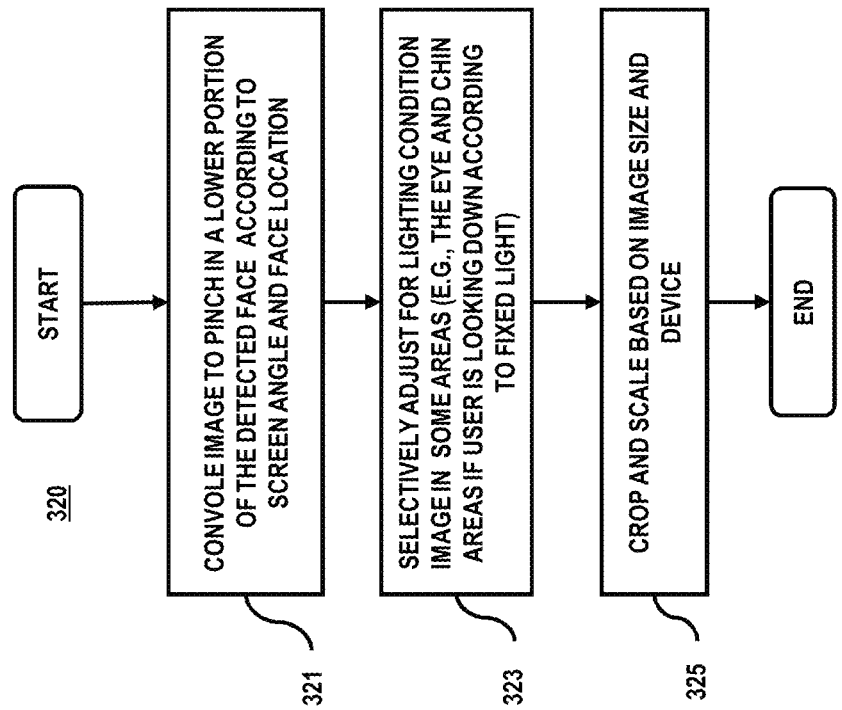

As seen in FIG. 3C, an image correction process 320 can be executed after certain geometrics parameters and/or camera parameters are determined. In this example, the image is convolved to modify (e.g., compress, stretch, etc.) a portion of the detected face according to the detected screen angle and face location (per step 321). For example, the lower portion of the face can be pinched to de-emphasize the chin. In general, the image can be adjusted horizontally by compressing or stretching the image according to a curve dictated by the angle of the camera relative to the subject face (and possible user input controls). For example, if the camera was held too high, the image can be stretch at the bottom or pinch at the top according to the curve. The modification can also correct for left to right distortion, if the subject was off the central axis of the camera. In step 323, the image can be processed by, in some embodiments, selectively adjusting the brightness (or lighting) and/or contrast levels—e.g., brightening—in certain facial areas (e.g., the eye and chin areas if user is looking down in relationship to the fixed light). At this point, the modified or corrected image (e.g., de-warped) can be cropped and scaled based on image size and requirements of the user device 101 (e.g., display size and resolution, etc.).

Figure 3D:
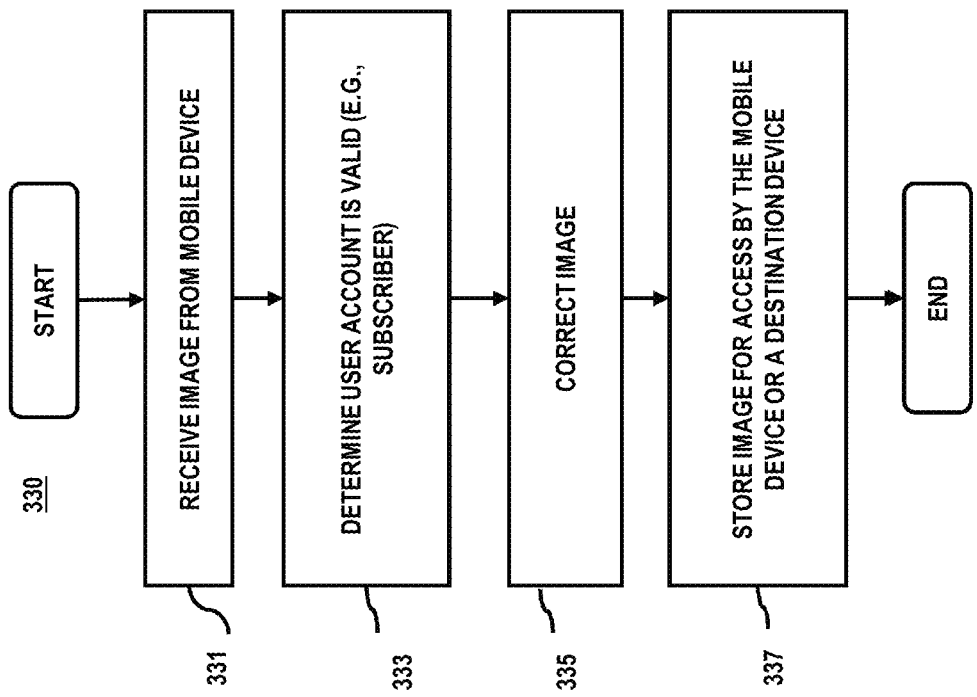

As mentioned, the correction scheme can be performed as part of a managed service, and thus, be applied at the image correction platform 105, as depicted in FIG. 3D.

As shown FIG. 3D, process 330, under this scenario, provides image correction (e.g., de-warping) by the platform 105. In step 331, an image of a subject captured by one or more cameras of the mobile device 101 is received. According to one embodiment, the subscription module 213 of the platform 105 can determine whether the mobile device 101 (or the user) is associated with a predetermined user account to permit acceptance of the image—for example, whether the user or mobile device 101 is a valid subscriber to the service (e.g., "image correction service") provided by image correction platform 105. In step 335, the received image is corrected according to the previously described image correction process. Namely, the geometrics parameter determination module 207 determines one or more geometrics parameters associated with the subject in relation to the mobile device 101. The camera parameter determination module 205 determines one or more camera parameters for the mobile device 101. Such determinations can be performed by the platform 105, which instructs and retrieves these information from the mobile device 101; alternatively, such information can be retrieved from device database 109. The image correction module 201 then applies an image correction scheme to the image based on the camera parameters and the geometrics parameters to output a modified image. A database (e.g., images database 107) can store, per step 337, the modified image for access by the mobile device 101 or a recipient device that is configured to present the modified image.

It will be understood that each block or step of the above processes, and combinations of blocks in the processes or flowcharts, may be implemented by various means, such as hardware, firmware, and/or software including one or more computer program instructions. For example, one or more of the procedures described above may be embodied by computer program instructions. In this regard, the computer program instructions, which embody the procedures described above may be stored by a memory device of a mobile terminal, server, or other computing device and executed by a built-in processor in the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means, which implement the function specified in the flowchart block (s) or step(s). The computer program instructions may also be loaded onto a computer or other programmable apparatus to trigger a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

Figure 4:
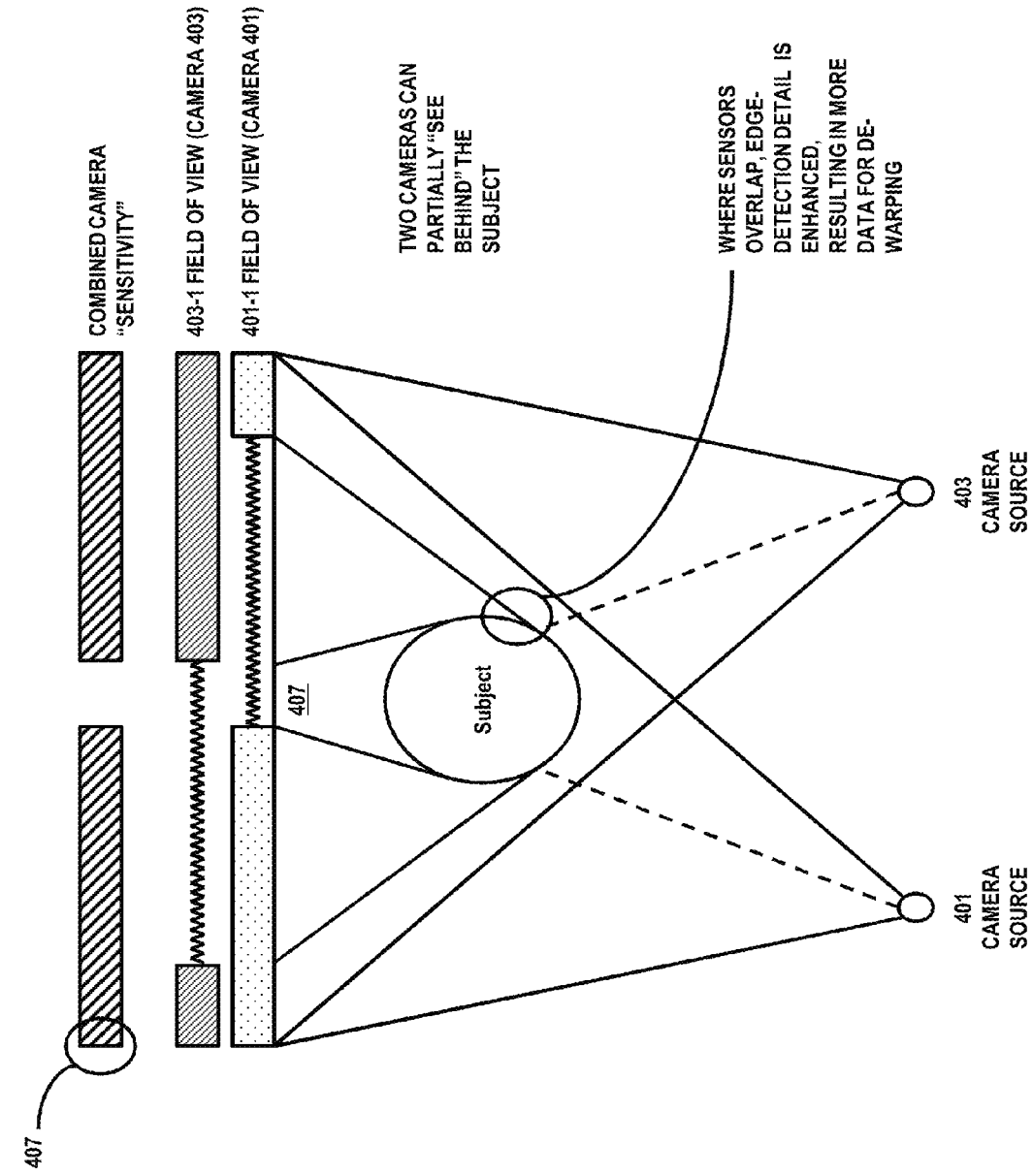
FIG. 4 is a diagram of multiple sensors for facilitating image correction, according to an exemplary embodiment.

FIG. 4 is a diagram of multiple sensors for facilitating image correction, according to an exemplary embodiment. In certain embodiments, a single camera source or multiple camera source can be implemented—e.g., a two-dimensional (2D) camera system as well as a 3D camera system (which may provide higher quality image relative to the 2D system). By way of example, in the case of multiple cameras 401 and 403 are used for providing an image signal; under this configuration, more data can be captured of the subject's foreground (e.g., the face) as compared to a single camera source. In a two camera configuration, one camera can capture data the other camera cannot; e.g., because the different fields of view can provide better coverage of the shadow area 405 vis-a-vis a single camera source. Hence, the increase in captured data allows improved edge detection of the foreground and a larger source of material in the background.

As seen in FIG. 4, the background 407 (or combined field of view) is larger, but not as detailed as the foreground (the foreground is captured twice by two cameras 401 and 403, while the background is mostly captured once with less redundancy but a wider field of view). This results in a more defined foreground (e.g., for de-warp processing) and a larger, more stable background for overlaying. Such arrangement shows how the larger background combined with better full cam edge-detection yields more stable background using multiple sensors (e.g., 3D input, 2D output).

In the 3D input and 3D output case, this can be treated as a 2D-2D case. The benefits of the dimensional reduction are lost when inputting and outputting to the same number of dimensions. (i.e., 2D:2D::3D:3D, but 3D:2D may yield more information to the 2D processing) When applied to a multiple-camera application, where the cameras 401 and 403 are not on the same plane, the additional axis cameras can further improve the foreground and background images.

Figure 5A:
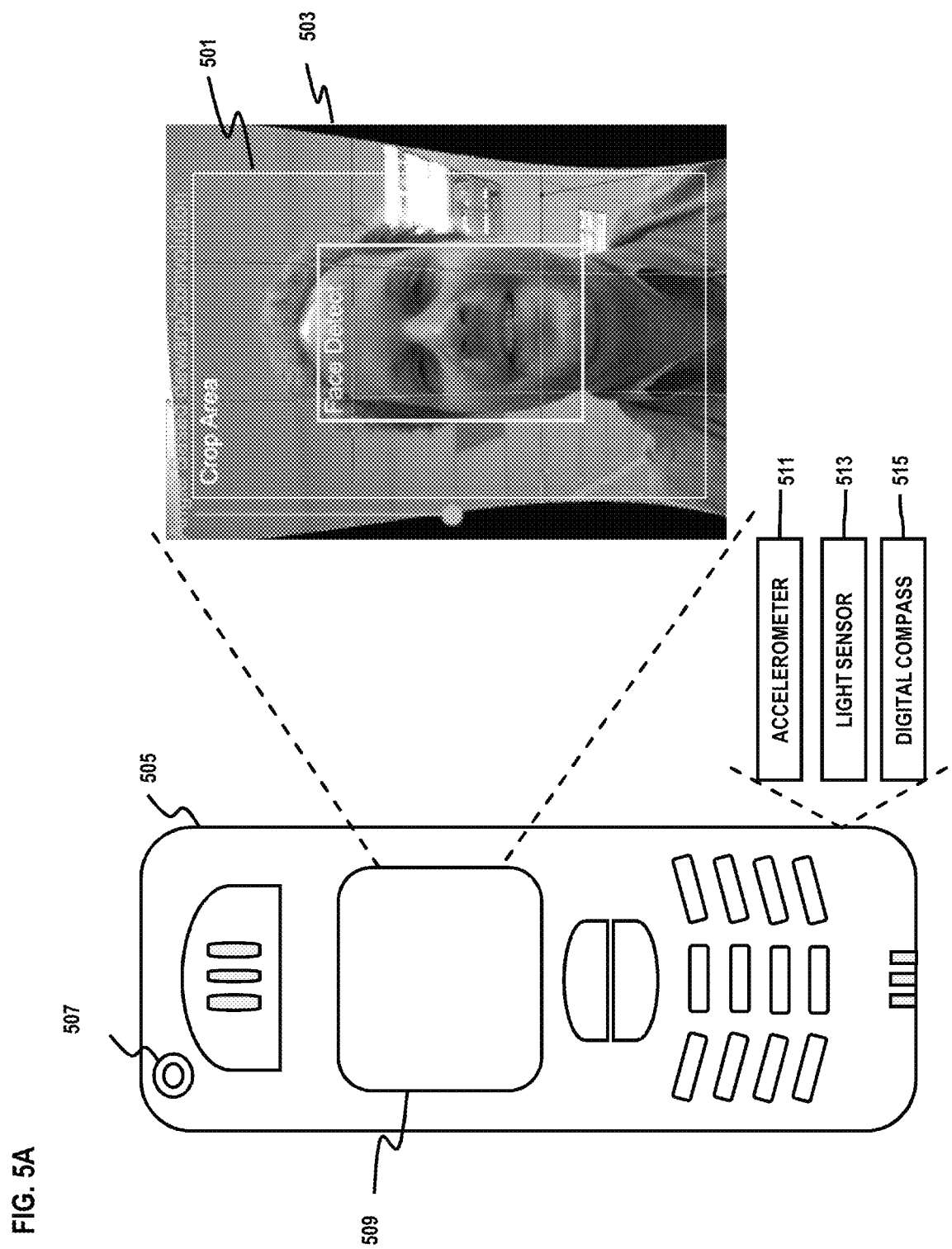
FIG. 5A is a diagram of an adjusted image (e.g., video frame), according to one embodiment.

FIG. 5A is a diagram of an adjusted image (e.g., video frame), according to one embodiment. In particular, a crop area 501 can be defined within a modified image 503 as part of an application resident on a mobile device 505, which includes a camera 507 and a display 509. The display 509 can be touch-screen, whereby the user can specify the crop area 501. This crop area 501 can be suggested by the application (as explained in FIG. 3C), or provided as a default whereby the user can then adjust the crop area. In addition, or in the alternative, to the cropping function, it is contemplated that a zoom function can be implemented.

Figure 5B:
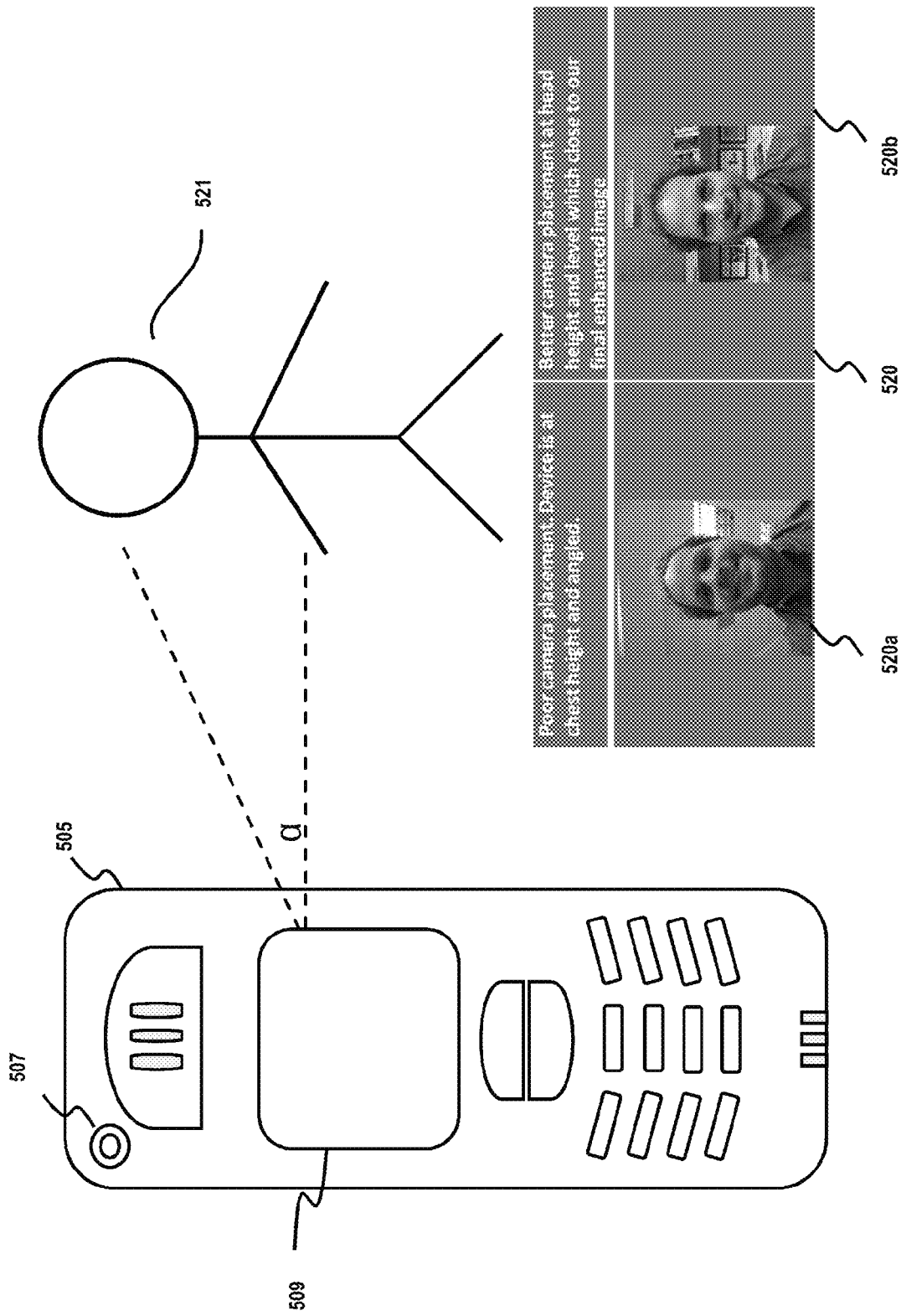
FIG. 5B is a diagram of a mobile device capable of prompting for an improved image capture position, according to an exemplary embodiment.

FIG. 5B is a diagram of a mobile device capable of prompting for an improved image capture position, according to an exemplary embodiment. By way of example, display 509 can present image 520 of subject as part of a graphical user interface (GUI). In this example, the left hand side of the image 520a illustrates a scenario involving poor camera placement because the device 505 is situated, for instance, at chest height and angled rather acutely. The right hand side picture 520b illustrates the better camera 502 placement at head height and level which close to our final enhanced image.

It is contemplated that the concepts of the correction scheme of FIGS. 3A-3D may be employed to provide an overlay indicator (or equivalent) that assists the user in positioning the camera 507 of the mobile device 505 for an idealized shot.

Moreover, in certain embodiments, the intensity of the image correction can be modified by the user through the mobile device's settings (i.e., a slider, numerical input, etc.), as input using the touch screen display 509.

In some embodiments, mobile device 505 includes an accelerometer 511 to measure acceleration of the device 505, and a digital compass 513 to determine orientation of the device 505. The measurements from accelerometer 511 and the compass 513 can be utilized to acquire location of the mobile device 505 in relation to the subject, for example. Accelerometer 511 can also measure absolute angle of the device 101 as compared to gravity. Acceleration values can be used to determine the rate of change of the angles, providing ongoing corrections as the user's hand tilts or moves from one position to the next. In other words, position information can be readily obtained.

Further, a light sensor 515 can be embedded or otherwise affixed to the mobile device 505 for determining lighting information. As such, processing of the captured image can be performed to improve the lighting conditions by altering the brightness to, for example, remove shadowing within the facial features.

The above processes, according to certain embodiments, advantageously provide enhanced user experience in, for instance, conducting various communication sessions and image-based applications.

The processes described herein, which provides device angle image correction may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
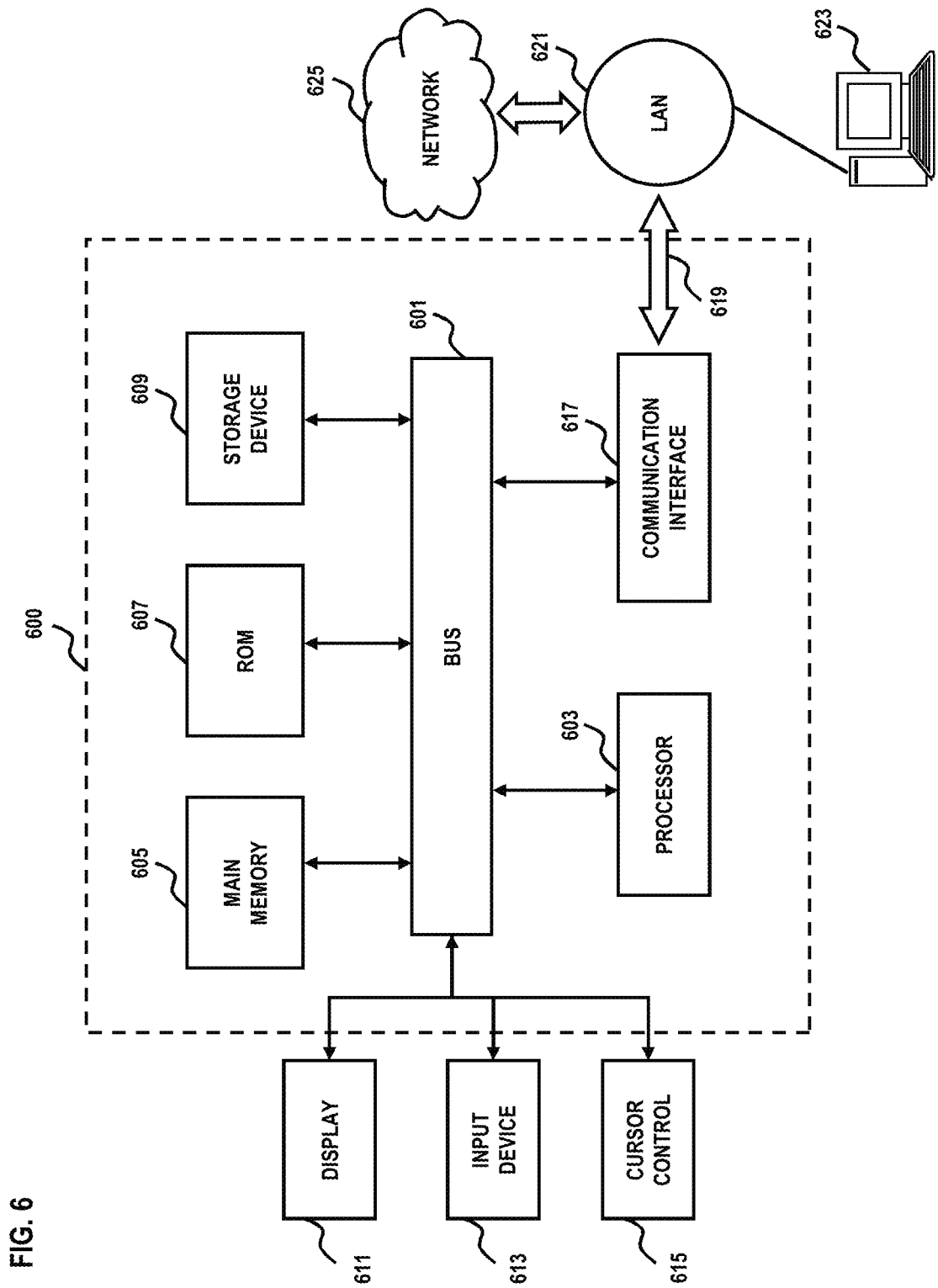
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
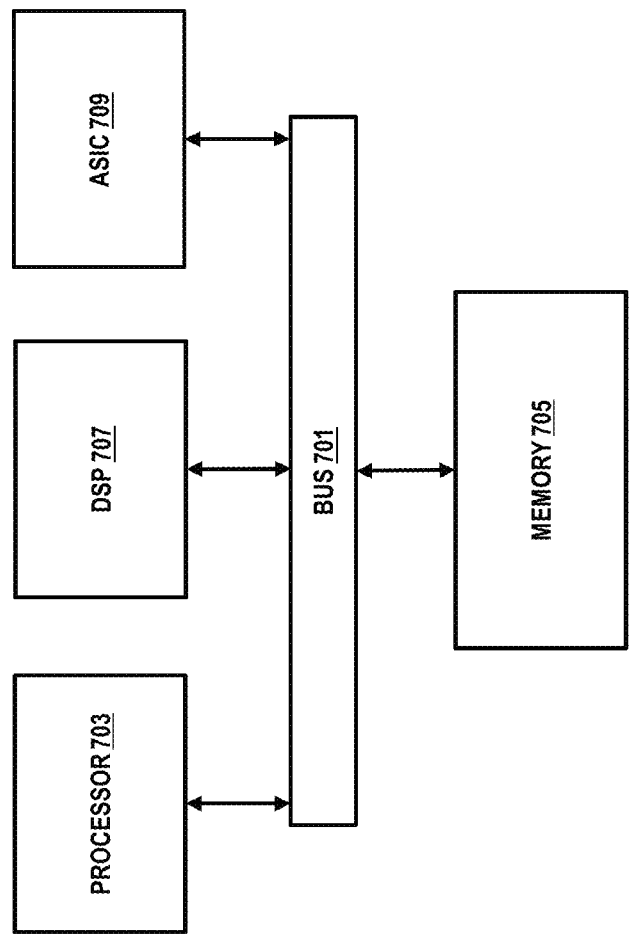
FIG. 7 is a diagram of a chip set that can be used to implement an embodiment of the invention.

FIG. 7 illustrates a chip set or chip 700 upon which an embodiment of the invention may be implemented. Chip set 700 is programmed to configure an image correction platform to enable the angle correction system for modify the images as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of configuring an image correction platform to enable the angle correction system for modify the images.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to configure an image correction platform to enable the angle correction system for modify the images. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
capturing a first image of a subject via a camera of a mobile device;
capturing a second image of the subject from another camera of the mobile device;
determining one or more geometrics parameters associated with the subject in relation to the mobile device;
determining one or more camera parameters for the mobile device; and
applying an image correction scheme to the first and second images based on the camera parameters and the geometrics parameters to output a modified image, wherein a foreground of the subject is more defined and a background of the subject is enlarged in the modified image using a plurality of views of the cameras.

2. A method according to claim 1, further comprising:
invoking an application to establish a communication session, wherein the modified image is transmitted to a destination device configured to present the modified image.

3. A method according to claim 1, wherein the geometrics parameters include angle information specifying an angle from the cameras to the subject, the modified image resulting in a more direct perspective of the subject relative to the cameras.

4. A method according to claim 1, wherein the geometrics parameters include a screen angle and a location of a face of the subject, the method further comprising:
detecting the face of the subject within the first and second images, wherein the image correction scheme includes:
convolving to modify in a portion of the detected face according to the screen angle and the face location.

5. A method according to claim 1, further comprising:
detecting a plurality of facial features of the subject within the first and second images, the facial features including an eye area and a chin area; and
brightening the first and second images with respect to the eye area and the chin area.

6. A method according to claim 1, wherein the geometrics parameters or the camera parameters include sensor reading information relating to lighting, digital compass, accelerometer, or a combination thereof.

7. A method according to claim 1, further comprising:
presenting a prompt, via the mobile device, to position the cameras of the mobile device with respect to the subject.

8. A method according to claim 1, further comprising:
cropping and scaling the modified image.

9. An apparatus comprising:
at least one processor; and
at least one memory including computer program code for one or more programs,
the at least one memory and the computer program code configured to, with the at least one processor, cause the apparatus to perform at least the following,
capturing a first image of a subject via a camera of a mobile device,
capturing a second image of the subject from another camera of the mobile device,
determine one or more geometrics parameters associated with the subject in relation to the mobile device,
determine one or more camera parameters for the mobile device, and
apply an image correction scheme to the first and second images based on the camera parameters and the geometrics parameters to output a modified image, wherein a foreground of the subject is more defined and a background of the subject is enlarged using a plurality of views of the cameras.

10. An apparatus according to claim 9, wherein the apparatus is further caused to:
invoke an application to establish a communication session, wherein the modified image is transmitted to a destination device configured to present the modified image.

11. An apparatus according to claim 9, wherein the geometrics parameters include angle information specifying an angle from the cameras to the subject, the modified image resulting in a more direct perspective of the subject relative to the cameras.

12. An apparatus according to claim 9, wherein the geometrics parameters include a screen angle and a location of a face of the subject, and the apparatus is further caused to:
- detect the face of the subject within the first and second images, wherein the image correction scheme includes:
- convolving to modify in a portion of the detected face according to the screen angle and the face location.

13. An apparatus according to claim 9, wherein the apparatus is further caused to:
- detect a plurality of facial features of the subject within the first and second images, the facial features including an eye area and a chin area; and
- adjust lighting of the first and second images with respect to the eye area and the chin area.

14. An apparatus according to claim 9, wherein the geometrics parameters or the camera parameters include sensor reading information relating to lighting, digital compass, accelerometer, or a combination thereof.

15. An apparatus according to claim 9, wherein the apparatus is further caused to:
- present a prompt, via the mobile device, to position the cameras of the mobile device with respect to the subject.

16. An apparatus according to claim 9, wherein the apparatus is further caused to:
- crop and scale the modified image.

17. A system comprising:
- an image correction platform configured to receive images of a subject captured by two or more cameras of a mobile device, wherein the image correction platform includes,
- a geometrics parameter determination module configured to determine one or more geometrics parameters associated with the subject in relation to the mobile device,
- a camera parameter determination module configured to determine one or more camera parameters for the mobile device, and
- an image correction module configured to apply an image correction scheme to the images based on the camera parameters and the geometrics parameters to output a modified image, wherein a foreground of the subject is more defined and a background of the subject is enlarged using a plurality of views of the cameras; and
- a database coupled to the image correction platform and configured to store the modified image for access by the mobile device or a recipient device configured to present the modified image.

18. A system according to claim 17, wherein the image correction platform includes a subscription module configured to determine whether the mobile device is associated with a predetermined user account to permit acceptance of the image.

* * * * *